United States Patent
Ringseth et al.

(10) Patent No.: US 9,720,729 B2
(45) Date of Patent: Aug. 1, 2017

(54) SCHEDULER FINALIZATION

(75) Inventors: Paul Ringseth, Bellevue, WA (US); Genevieve Fernandes, Redmond, WA (US); Rick Molloy, Redmond, WA (US); Rahul Patil, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1661 days.

(21) Appl. No.: 12/131,128

(22) Filed: Jun. 2, 2008

(65) Prior Publication Data
US 2009/0300627 A1 Dec. 3, 2009

(51) Int. Cl.
G06F 9/46 (2006.01)
G06F 9/48 (2006.01)

(52) U.S. Cl.
CPC .................. G06F 9/4881 (2013.01)

(58) Field of Classification Search
None
See application file for complete search history.

(56) References Cited

U.S. PATENT DOCUMENTS

| | | | |
|---|---|---|---|
| 5,379,428 A | 1/1995 | Belo | |
| 5,428,781 A | 6/1995 | Duault et al. | |
| 6,195,676 B1 | 2/2001 | Spix et al. | |
| 6,269,391 B1 | 7/2001 | Gillespie | |
| 6,769,122 B1 * | 7/2004 | Daudel | 718/102 |
| 7,194,741 B2 | 3/2007 | Tayyar et al. | |
| 7,386,586 B1 * | 6/2008 | Headley et al. | 709/202 |
| 2003/0088425 A1 * | 5/2003 | Lam et al. | 705/1 |
| 2004/0165588 A1 | 8/2004 | Pandya | |
| 2004/0205110 A1 * | 10/2004 | Hinshaw | 709/201 |
| 2005/0081200 A1 * | 4/2005 | Rutten et al. | 718/100 |
| 2006/0017969 A1 * | 1/2006 | Ly et al. | 358/1.15 |
| 2006/0143616 A1 | 6/2006 | Koike et al. | |
| 2006/0250981 A1 * | 11/2006 | Li et al. | 370/254 |
| 2007/0074217 A1 | 3/2007 | Rakvic et al. | |
| 2007/0101326 A1 | 5/2007 | Cai et al. | |
| 2007/0226739 A1 | 9/2007 | Dodge et al. | |
| 2008/0005744 A1 * | 1/2008 | Buco et al. | 718/105 |
| 2008/0189709 A1 * | 8/2008 | Amin | 718/102 |
| 2009/0158286 A1 * | 6/2009 | Carteri et al. | 718/102 |
| 2010/0115048 A1 * | 5/2010 | Scahill | 709/213 |

OTHER PUBLICATIONS

Zalamea, et al., "MIRS Modulo Scheduling with Integrated Register Spilling", In Proc. of 14th Annual Workshop on Languages and Compilers for Parallel Computing (LCPC2001), Aug. 2001, 15 Pages.

(Continued)

*Primary Examiner* — Dong Kim
(74) *Attorney, Agent, or Firm* — Dicke, Billig & Czaja, PLLC

(57) ABSTRACT

A runtime environment allows a scheduler in a process of a computer system to be finalized prior to the process completing. The runtime environment causes execution contexts that are inducted into the scheduler and execution contexts created by the scheduler to be tracked. The runtime environment finalizes the scheduler subsequent to each inducted execution context exiting the scheduler and each created execution context being retired by the scheduler.

19 Claims, 13 Drawing Sheets

(56) References Cited

OTHER PUBLICATIONS

Zheng, et al., "SWAP: A Scheduler with Automatic Process Dependency Detection", Proceedings of the First Symposium on Networked Systems Design and Implementation, Mar. 29-31, 2004, 15 Pages.
Quintana-Orti, et al. "Scheduling of QR Factorization Algorithms on SMP and Multi-Core Architectures", Proceedings of the 16th Euromicro Conference on Parallel, Distributed and Network-Based Processing (PDP 2008), Year of Publication: 2008, pp. 1-15.

* cited by examiner

SCHEDULER FINALIZATION

BACKGROUND

Processes executed in a computer system may include execution context schedulers that schedule tasks of processes for execution in the computer system. A scheduler may create execution contexts (e.g., threads, fibers, or child processes) in order to execute tasks. A scheduler may also allow external execution contexts of the process to be inducted into the scheduler in order to execute tasks.

A scheduler may not have complete control over external execution contexts inducted into the scheduler. For example, an inducted execution context may not include a mechanism for notifying the scheduler upon executing to completion within the scheduler. Even if the scheduler completes and retires all execution contexts that the scheduler created, the scheduler may not be able to be terminated because of the possibility of undesirably interrupting the execution of an inducted external execution context.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A runtime environment allows a scheduler in a process of a computer system to be finalized prior to the process completing. The runtime environment causes execution contexts that are inducted into the scheduler and execution contexts created by the scheduler to be tracked. The runtime environment finalizes the scheduler subsequent to each inducted execution context exiting the scheduler and each created execution context being retired by the scheduler. Execution contexts that exit the scheduler may continue to execute outside of the scheduler.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

FIGS. 1A-1D are block diagrams illustrating embodiments of a runtime environment 10 that allows a scheduler 22 in a process 12 to be finalized.

Figure 1A:
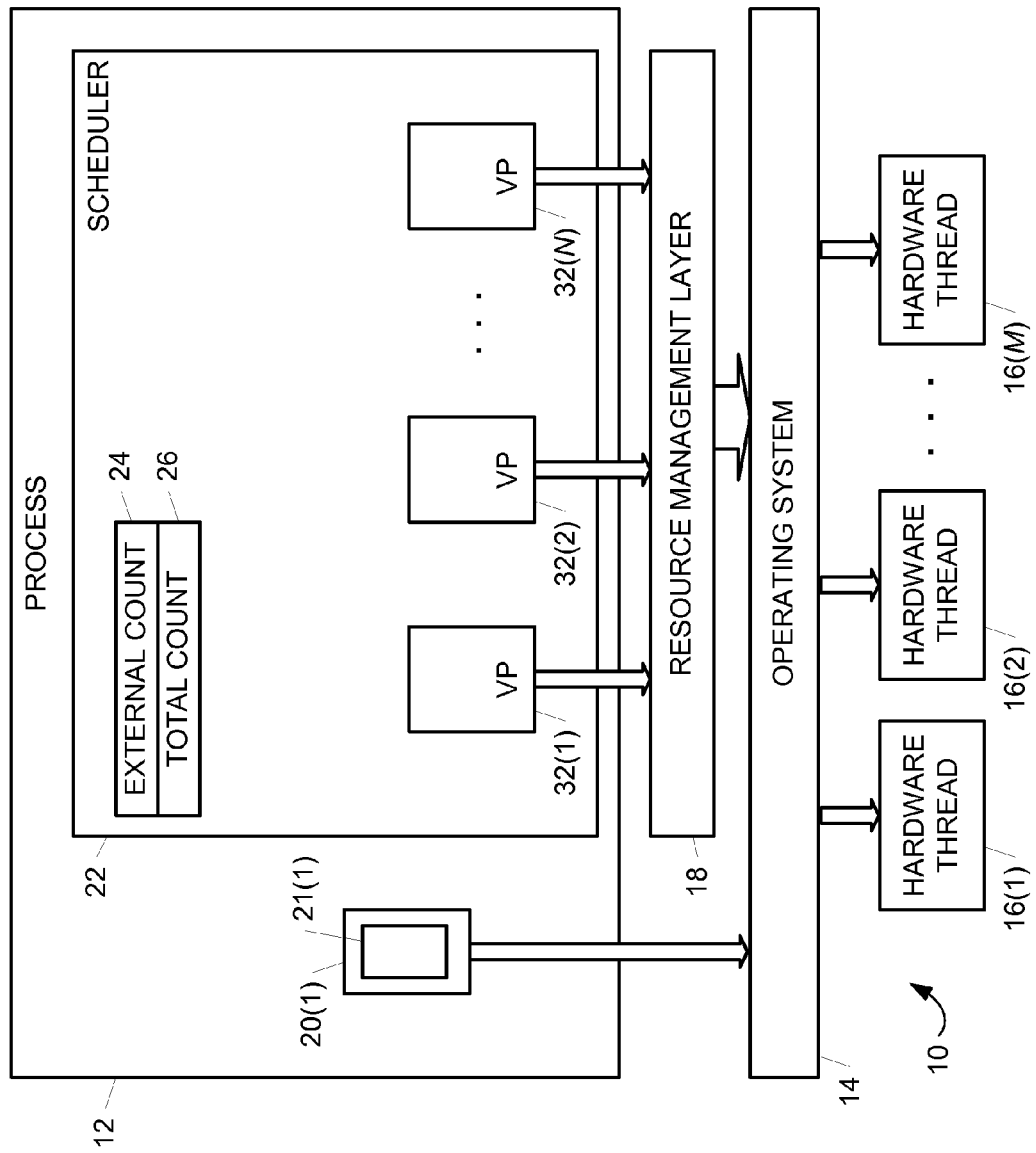
FIGS. 1A-1D are block diagrams illustrating embodiments of a runtime environment that allows a scheduler in a process to be finalized.

Referring to FIG. 1A, runtime environment 10 represents a runtime mode of operation in a computer system, such as a computer system 100 shown in FIG. 8 and described in additional detail below, where the computer system is executing instructions. The computer system generates runtime environment 10 from a runtime platform such as a runtime platform 122 shown in FIG. 8 and described in additional detail below.

Runtime environment 10 includes an least one invoked process 12, an operating system (OS) 14, a set of hardware threads 16(1)-16(M), where M is an integer that is greater than or equal to one and denotes the Mth hardware thread 16(M), and a resource management layer 18. Runtime environment 10 allows tasks from process 12 to be executed, along with tasks from any other processes that co-exist with process 12 (not shown), using OS 14, resource management layer 18, and hardware threads 16(1)-16(M). Runtime environment 10 operates in conjunction with OS 14 and/or resource management layer 18 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that hosts one or more execution contexts (viz., threads, fibers, or child processes). Process 12 obtains access to the processing and other resources in the computer system (e.g., hardware threads 16(1)-16(M)) from OS 14 and/or resource management layer 18. Process 12 causes tasks to be executed using the processing and other resources.

Process 12 generates work in tasks of variable length where each task is associated with an execution context in scheduler 22. Each task includes a sequence of instructions that perform a unit of work when executed by the computer system. Each execution context forms a thread (or analogous OS concept such as child process) that executes associated tasks on allocated processing resources. Each execution context includes program state and machine state information to allow execution to be paused (i.e., blocked) and resumed (i.e., unblocked). Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

OS 14 manages processing and other resources of the computer system and provides a set of functions that allow process 12 and other processes in the computer system to access and use the components. In addition, OS 14 offers execution contexts to scheduler 22 and process 12 in the computer system.

Hardware threads 16 reside in execution cores of a set or one or more processor packages (e.g., processor packages 102 shown in FIG. 8 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Resource management layer 18 allocates processing resources to process 12 by assigning one or more hardware threads 16 to process 12. Resource management layer 18 exists separately from OS 14 in the embodiments of FIGS. 1A-1D. In other embodiments, resource management layer 18 or some or all of the functions thereof may be included in OS 14.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specify one or more policies for scheduler 22.

Scheduler 22 interacts with resource management layer 18 to negotiate processing and other resources of the computer system in a manner that is transparent to process 12. Resource management layer 18 allocates hardware threads 16 to scheduler 22 based on supply and demand and any policies of scheduler 22.

In the embodiment shown in FIGS. 1A-1D, scheduler 22 manages the processing resources by creating virtual processors 32 that form an abstraction of underlying hardware threads 16. Scheduler 22 includes a set of virtual processors 32(1)-32(N) where N is an integer that is greater than or equal to one and denotes the Nth virtual processor 32(N). Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

Runtime environment 10 allows scheduler 22 in process 12 to be finalized prior to process 12 completing. Runtime environment 10 causes execution contexts 20 that are inducted into scheduler 22 and execution contexts 38 created by the scheduler to be tracked. Runtime environment 10 finalizes scheduler 22 subsequent to each inducted execution context 20 exiting scheduler 22 and each created execution context 38 being retired by scheduler 22. Execution contexts 20 that exit scheduler 22 may continue to execute outside of scheduler 22 in process 12.

Figure 2:
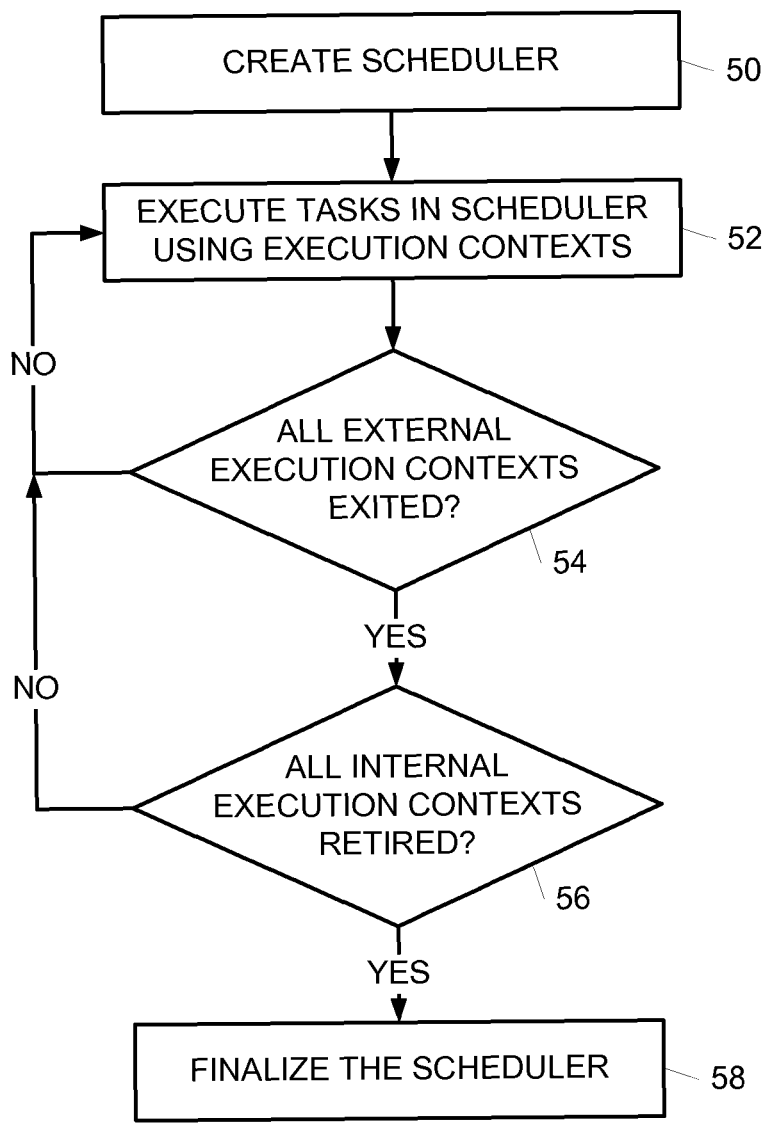
FIG. 2 is a flow chart illustrating an embodiment of a method for finalizing a scheduler in a process.

FIG. 2 is a flow chart illustrating an embodiment of a method for finalizing scheduler 22 in process 12. Scheduler 22 is implicitly or explicitly created in process 12 as indicated in a block 50. Tasks are executed in scheduler 22 using execution contexts as indicated in a block 52. The execution contexts in scheduler 22 may include external execution contexts inducted into scheduler 22. External execution contexts may be inducted into scheduler 22 in response to generating tasks for execution by scheduler 22 or by explicitly creating scheduler 22. The execution contexts in scheduler 22 may also include internal execution contexts created by scheduler 22 to execute the tasks of scheduler 22.

Determinations are made as to whether all external execution contexts have exited scheduler 22 as indicated in a block 54 and whether all internal execution contexts have been retired by scheduler 22 as indicated in a block 56. In one embodiment, when all external execution contexts exit, scheduler 22 only continues executing tasks as long as tasks exist in scheduler 22. When no more tasks exist in scheduler 22, scheduler 22 instructs the internal execution contexts to exit, thereby triggering the retirement of the internal execution contexts. In other embodiments, scheduler 22 directs the internal execution contexts to retire when each currently executing task has completed or when a subset of existing tasks have completed execution. Any external execution contexts may continue to execute tasks in other schedulers 22 subsequent to exiting scheduler 22. After all external execution contexts exit and all internal execution contexts are retired, scheduler 22 is finalized prior to process 12 completing as indicated in a block 58.

Figure 3A:
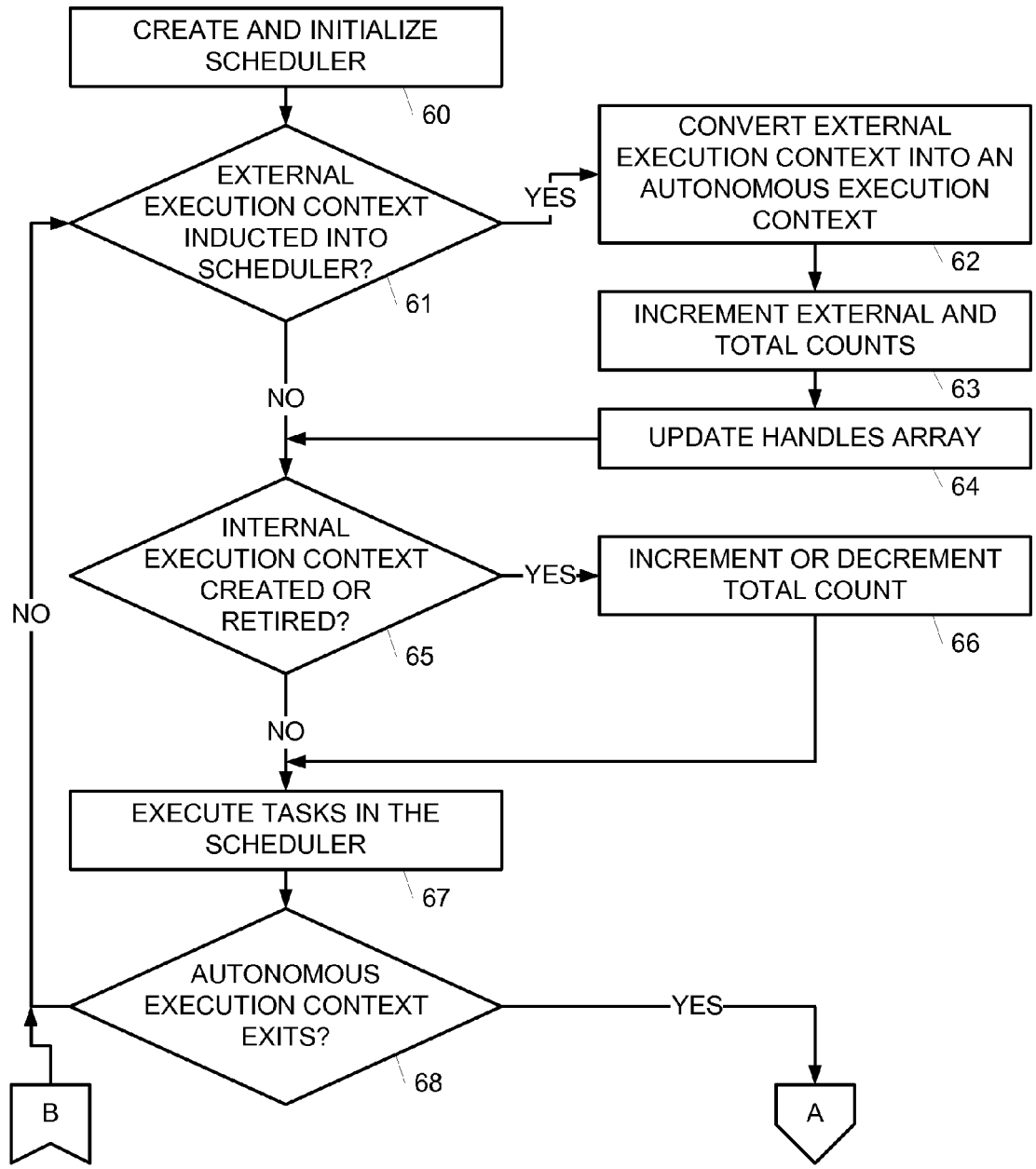
FIGS. 3A-3B are flow charts illustrating embodiments of a method for finalizing a scheduler in a process.
Figure 3B:
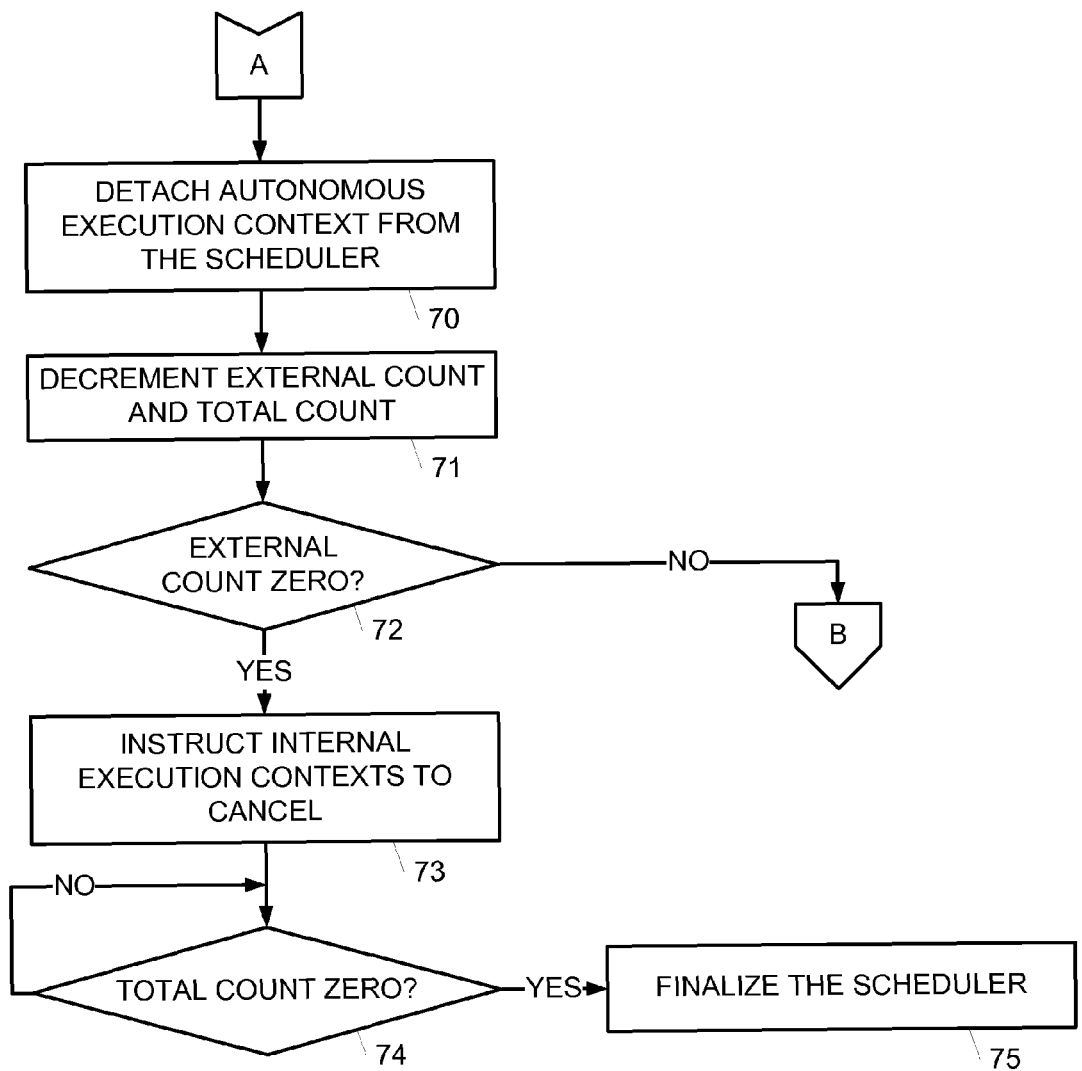

FIGS. 3A-3B are flow charts illustrating additional embodiments of a method for finalizing scheduler 22 in process 12. The method of FIG. 3A-3B will be described with reference to the embodiments of FIGS. 1A-1D.

In FIG. 3A, scheduler 22 is implicitly or explicitly created and initialized in process 12 as indicated in a block 60. In FIG. 1A, scheduler 22 may be created implicitly or explicitly by external execution context 20(1) or another execution context. Scheduler 22 is initialized to include an external count 24 and a total count 26 where external count 24 and total count 26 are initially set to zero in one embodiment. External count 24 tracks a number of external execution contexts 20 that have been inducted into scheduler 22, and total count 26 tracks the number of external execution contexts 20 that have been inducted into scheduler 22 and a number of internal execution contexts (e.g., execution contexts 34 and 38 shown in FIG. 1C) created by scheduler 22 to execute tasks (e.g., tasks 36, 40, and 42 shown in FIG. 1C). In one embodiment, a daemon (e.g., the daemon described with reference to FIG. 4 below) may be created as part of the initialization of scheduler 22 to assist with tracking external count 24 and total count 26.

A determination is made as to whether an external execution context 20 is inducted into scheduler 22 as indicated in a block 61. External execution contexts 20 may be inducted into scheduler 22 in response to generating tasks for execution by scheduler 22 or by explicitly creating scheduler 22.

If an external execution context 20 is inducted into scheduler 22, then scheduler 22 converts the external execution context 20 into an autonomous execution context 20 as indicated in a block 62. As used herein, an autonomous execution context is an external execution context of scheduler 22. Each autonomous execution context executes on a processing resource of scheduler 22 but is not under the control of scheduler 22. Accordingly, scheduler 22 provides a processing resource of scheduler 22 for use by an autonomous execution context to allow the autonomous execution context to execute on the processing resource. When external execution contexts 20 directly execute on virtual processors 32 belonging to scheduler 22, scheduler 22 turns control of the virtual processors 32 over to external execution contexts 20. By doing so, scheduler 22 may avoid a potentially expensive context switching and allow scheduling policies of scheduler 22 to be applied to the external execution contexts 20. Scheduler 22 increments external count 24 and total count 26 in response to an external execution context 20 being inducted into scheduler 22 as indicated in a block 63 and updates a handles array (not shown) that identifies execution contexts in scheduler 22 as indicated in a block 64. In one embodiment, a daemon may cause the handles array to be updated as described with reference to the embodiment of FIG. 4 below.

Figure 1B:
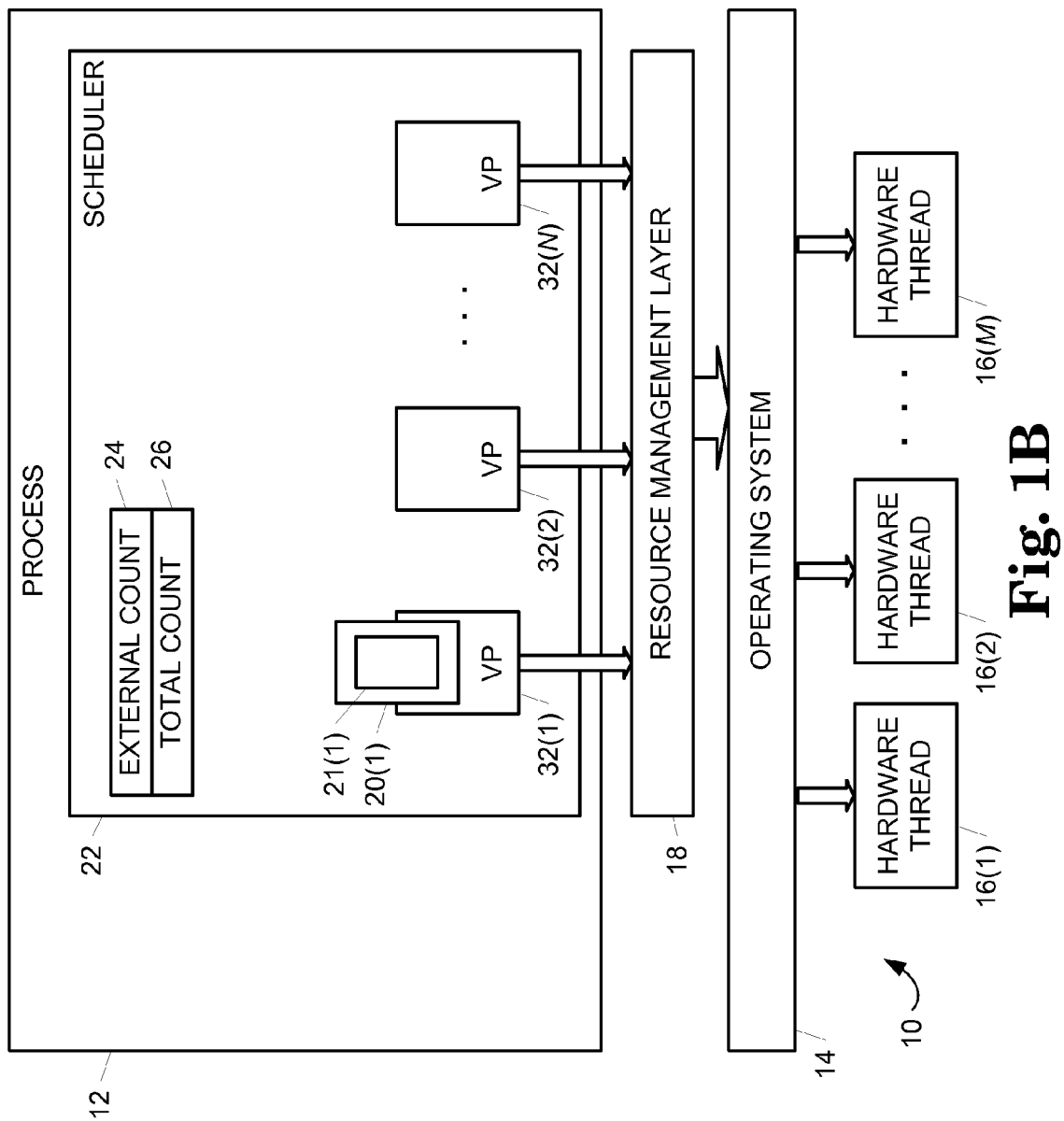

With reference to the example of FIG. 1B, external execution context 20(1) is inducted into scheduler 22. Scheduler 22 converts external execution context 20(1) into an autonomous execution context 20(1) and provides virtual processor 32(1) to autonomous execution context 20(1). Virtual processor 32(1) executes task 21(1) of autonomous execution context 20(1). Scheduler 22 increments external count 24 and total count 26 in response to external execution context 20(1) being inducted into scheduler 22 and updates the handles array with a handle that identifies autonomous execution context 20(1) in scheduler 22.

Figure 1C:
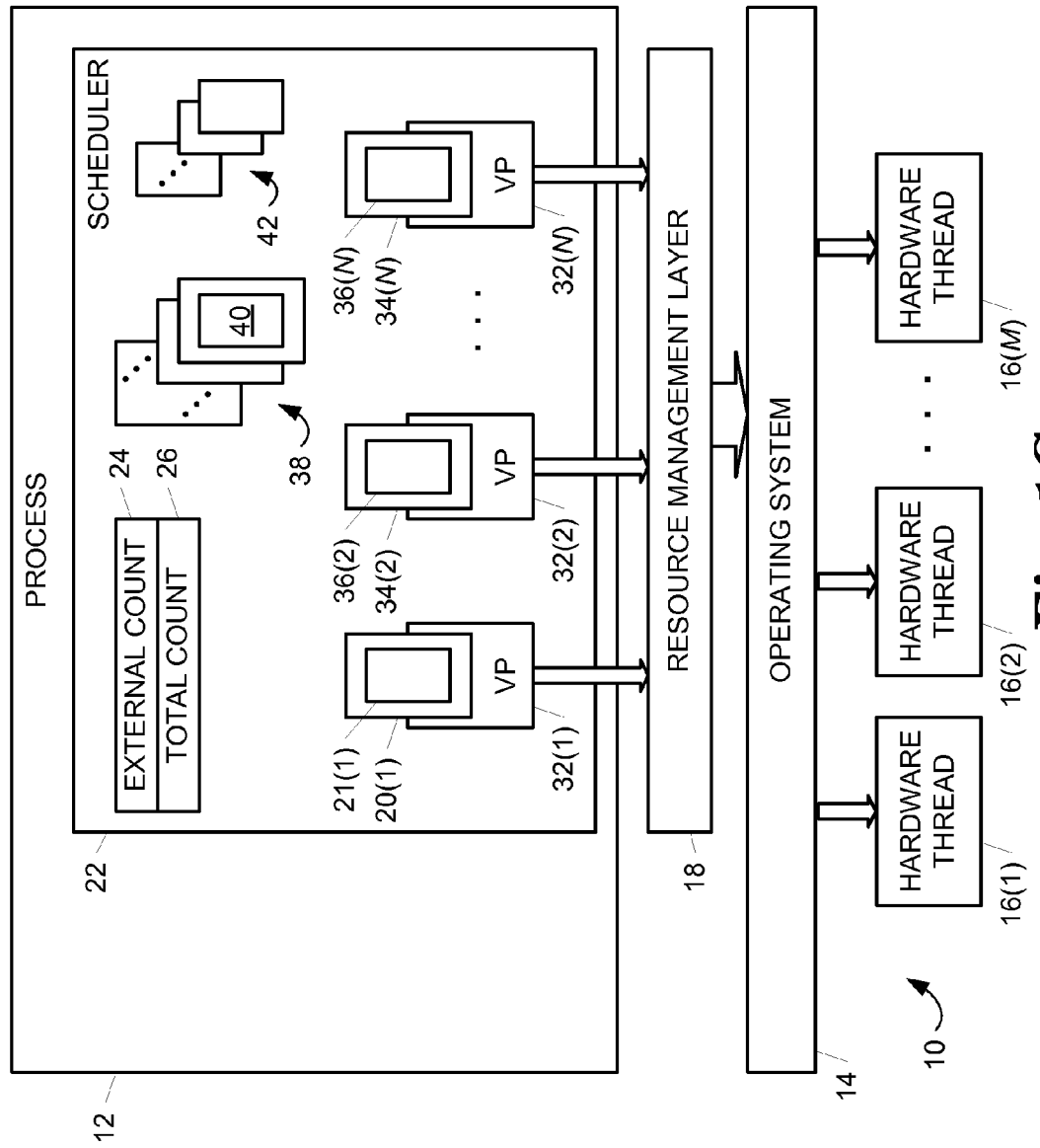

A determination is made as to whether an internal execution context 34 or 38 is created or retired in scheduler 22 as indicated in a block 65. With reference to FIG. 1C, scheduler 22 obtains internal execution contexts 34 and 38 from OS 14 and uses internal execution contexts 34 and 38 to execute tasks 36, 40, and 42. Scheduler 22 retires internal execution contexts 34 and 38 upon completion of tasks 36, 40, and 42. Each time that an internal execution context 34 or 38 is created in scheduler 22, scheduler 22 increments total count 26 as indicated in a block 66. Scheduler 22 also decrements total count 26 each time that an internal execution context 34 or 38 is retired in scheduler 22 as indicated in block 66. Accordingly, scheduler 22 increments total count 26 for each internal execution contexts 34 and 38 shown in the example of FIG. 1C.

Scheduler 22 executes tasks in scheduler 22 using autonomous execution contexts 20 and internal execution contexts 34 and 38 as indicated in a block 67.

In the example of FIG. 1C, scheduler 22 includes autonomous execution context 20(1) which is being executed by virtual processor 32(1), execution contexts 34(2)-34(N) with associated tasks 36(2)-36(N), respectively, which are being executed by respective virtual processors 32(2)-32(N), and a set of execution contexts 38. Each execution context 20, 34, and 38 includes state information that indicates whether an execution context 20, 34, or 38 is executing, runnable (e.g., in response to becoming unblocked or added to scheduler 22), or blocked. Execution contexts 20 and 34 that are executing have been attached to a virtual processor 32 and are currently executing. Execution contexts 38 that are runnable include an associated task 40 and are ready to be executed by an available virtual processor 32. Execution contexts 38 that are blocked also include an associated task 40 and are waiting for data, a message, or an event that is being generated by another execution context 34, will be generated by another execution context 38, or will be generated by an event generated external to the blocked context (e.g., an OS event).

Each execution context 20 and 34 executing on a virtual processor 32 may generate, in the course of its execution, additional tasks 42, which are organized in any suitable way (e.g., added to work queues (not shown in FIGS. 1A-1D)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion or a blocking point (e.g. waiting for a message or a stolen child task to complete) on virtual processors 32 before picking up new tasks. When a task unblocks, the task is re-scheduled to execute on an available virtual processor, possibly with priority given to choosing a virtual processor 32 on the hardware thread 16 where it executed before blocking, in the hope that the memory hierarchy (viz., cache hierarchy) already contains data that can be optimally reused. An execution context 34 executing on a virtual processor 32 may also unblock other execution contexts 38 by generating data, a message, or an event that will be used by other execution contexts 38.

Figure 7:
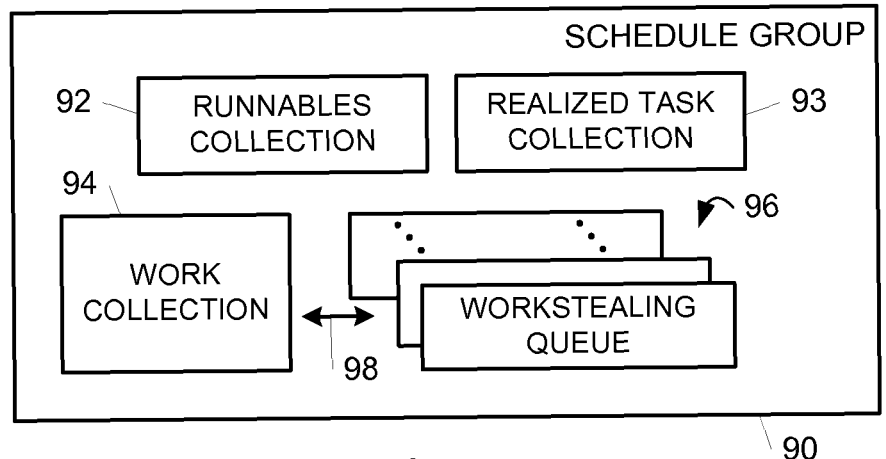
FIG. 7 is a block diagram illustrating an embodiment of a scheduling group for use in a scheduler.

Each task in scheduler 22 may be realized (e.g., realized tasks 36 and 40), which indicates that an execution context 34 or 38 has been or will be attached to the task and the task is ready to execute. Realized tasks typically include unblocked execution contexts and scheduled agents. A task that is not realized is termed unrealized. Unrealized tasks (e.g., tasks 42) may be created as child tasks generated by the execution of parent tasks and may be generated by parallel constructs (e.g., parallel, parallel for, begin, and finish). Scheduler 22 may be organized into a synchronized collection (e.g., a stack and/or a queue) for logically independent tasks with execution contexts (i.e., realized tasks)

along with a list of workstealing queues for dependent tasks (i.e., unrealized tasks) as illustrated in the embodiment of FIG. 7 described below.

Upon completion, blocking, or other interruption (e.g., explicit yielding or forced preemption) of a task 36 associated with an execution context 34 running on a virtual processor 32, the virtual processor 32 becomes available to execute another realized task 40 or an unrealized task 42. Scheduler 22 searches for a runnable execution context 38 (e.g., an unblocked execution context 38), a realized task 40 possibly attached to an execution context 38, or an unrealized task 42 to attach to the available virtual processor 32 for execution in any suitable way. For example, scheduler 22 may first search for a runnable execution context 38 to execute before searching for an unrealized task 42 to execute. Scheduler 22 continues attaching execution contexts 38 to available virtual processors 32 for execution until all tasks and execution contexts 38 of scheduler 22 have been executed.

Scheduler 22 creates and manages execution contexts 34 and 38. When a task 36 on an execution context 34 is executed to completion, blocks, or yields on a virtual processor 32, the execution context 34 returns control of the virtual processor 32 to scheduler 22. Scheduler 22 may then cause the virtual processor 32 to search for another task 40 or 42 to execute. Once found, if the task 40 or 42 is not already attached to an execution context 38, scheduler 22 provides an execution context 38 on which to execute the task 40 or 42 until all execution contexts 38 and tasks 42 have been executed to completion.

During the execution of tasks, scheduler 22 detects the exit of each autonomous execution contexts 20 as indicated in a block 68. An autonomous execution context 20 executes on a processing resource of scheduler 22 until the autonomous execution context 20 explicitly exits from scheduler 22 (e.g., via an API provided by runtime environment 10) or implicitly exits by completing. Each autonomous execution context 20 may cease executing on the processing resource and exit scheduler 22 at any time. With an explicit exit, scheduler 22 may readily detect that an autonomous execution context 20 has exited.

With implicit exits, autonomous execution contexts 20 may not include a mechanism for notifying scheduler 22 upon executing to completion (i.e., exiting implicitly) within scheduler 22. To detect when autonomous execution contexts 20 exit implicitly, scheduler 22 registers for notification events with OS 14 for each autonomous execution context 20 in one embodiment. Scheduler 22 determines that an autonomous execution context 20 exits implicitly in response to receiving a notification event associated with the autonomous execution context 20 from OS 14. Scheduler 22 may also regain control of virtual processors 32 used by autonomous execution contexts 20 that exited and causes tasks 40 or 42 associated with execution contexts 34 or 38 controlled by scheduler 22 to be executed by the virtual processors 32. In one embodiment, a daemon detects when autonomous execution contexts 20 exit implicitly as described with reference to the embodiment of FIG. 4 below.

In response to detecting that an autonomous execution context 20 has exited, scheduler 22 proceeds to from block A in FIG. 3A to block A in FIG. 3B to detach the autonomous execution context 20 from scheduler 22 as indicated in a block 70. As part of detaching the autonomous execution context 20 from scheduler 22, scheduler 22 updates the handles array to remove an identifier of the autonomous execution context 20. Scheduler 22 also decrements external count 24 and total count 26 as indicated in a block 71.

Scheduler 22 determines whether external count 24 is zero as indicated in a block 72. External count 24 becomes zero when all external execution contexts 20 that have been inducted into scheduler 22 have exited scheduler 22.

If external count 24 is zero, then scheduler 22 instructs the internal execution contexts 34 and 38 to cancel as indicated in a block 73. In one embodiment, scheduler 22 instructs the internal execution contexts 34 and 38 to cancel subsequent to a set of zero or more finalizing tasks being completed. If there are no finalizing tasks, scheduler 22 may use cancellation exceptions to instruct the internal execution contexts 34 and 38 to cancel. If the finalizing tasks are the currently executing tasks, scheduler 22 may shut down each virtual processor 32 upon completion, blocking, or yielding of the currently executing task and instruct the internal execution contexts 34 and 38 to cancel when all virtual processors 32 have been shut down.

If the finalizing tasks are all remaining tasks that exist in scheduler 22, the scheduler 22 instructs the internal execution contexts to exit when no more tasks exist in scheduler 22. To determine when no more tasks exist in scheduler 22, scheduler 22 receives signals from virtual processors 32 when no work is found for a predefined or configurable time interval. Scheduler 22 may cause virtual processors 32 to periodically search for tasks to execute or enter a sleep state until executable tasks are detected. When a sufficient interval of not finding executable tasks by any of virtual processors 32 has elapsed, scheduler 22 instructs the internal execution contexts to exit.

Scheduler 22 determines whether total count 26 is zero as indicated in a block 74. Total count 26 becomes zero when all internal execution contexts 34 and 38 created by scheduler 22 have been retired by scheduler 22. If total count 26 is not zero, then scheduler 22 waits until all internal execution contexts 34 and 38 have been retired. Scheduler 22 also prevents any additional external execution contexts 20 from being inducted into scheduler 22 subsequent to external count 24 becoming zero. In response to total count 26 becoming zero, scheduler 22 finalizes as indicated in a block 75. Scheduler 22 may finalize prior to process 12 completing such that process 12 may continue executing after scheduler 22 finalizes. Process 12 may also create other schedulers 22 after one or more schedulers 22 finalize.

Figure 1D:
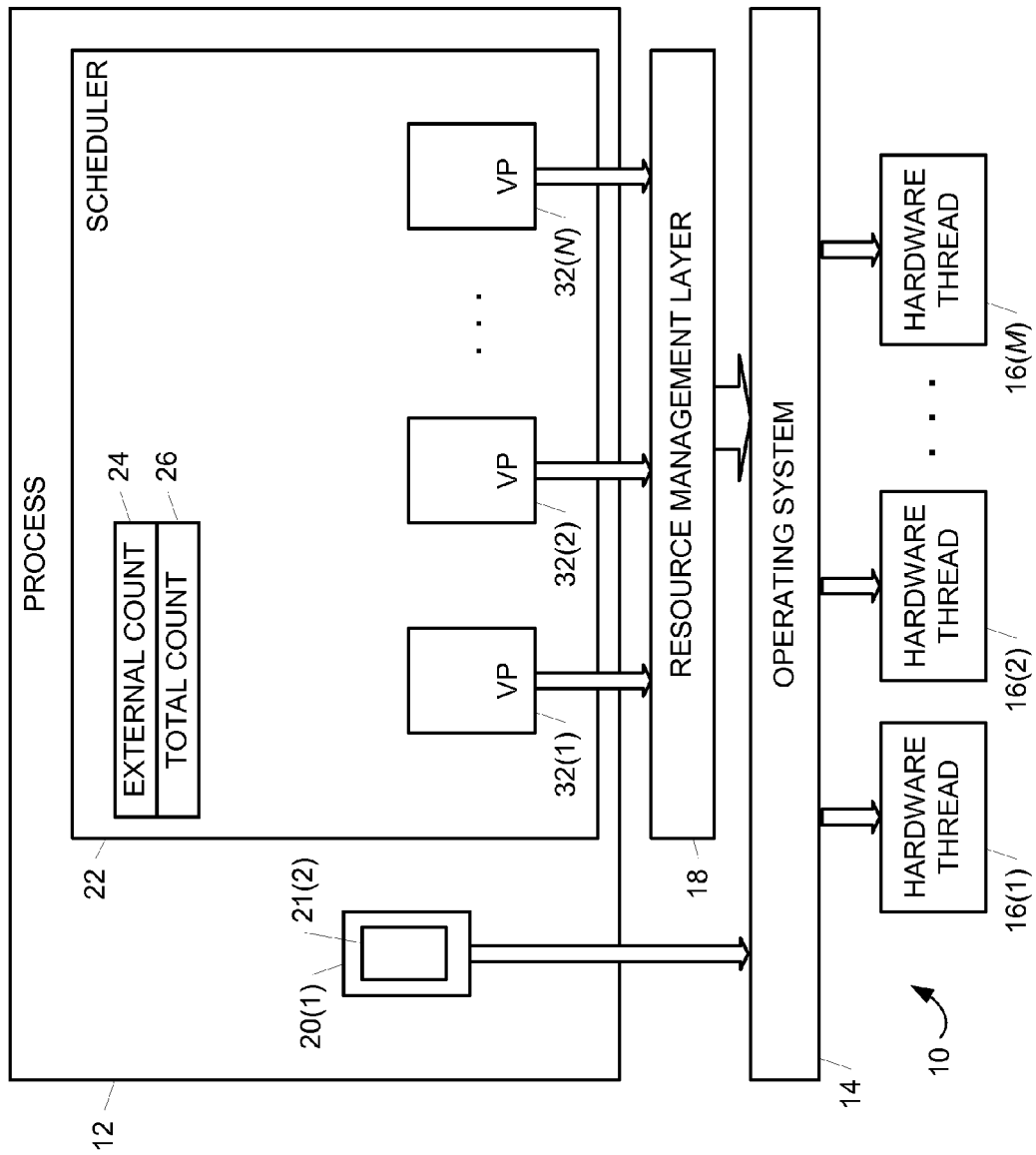

In the example of FIG. 1D, all execution contexts 20, 34, and 38 have exited, completed, or been terminated in scheduler 22. Autonomous execution context 20(1) explicitly detached from scheduler 22 in the example of FIG. 1D and continues to execute a task 21(1) outside of scheduler 22 (e.g., in another scheduler 22 not shown).

In one embodiment, scheduler 22 also notifies a daemon to exit when external count 24 becomes zero as will now be described with reference to the embodiment of FIG. 4.

If external count 24 is not zero in block 72 of FIG. 3B, then scheduler 22 proceeds to from block B in FIG. 3B to block B in FIG. 3A to repeat the functions of blocks 61-68 as appropriate. In one embodiment, scheduler 22 continues executing tasks as indicated in block 67 and performs the functions of blocks 61, 65, and 68 only in response to detecting events associated with blocks 61, 65, and 68. In other embodiments, scheduler 22 repeat the functions of blocks 61-68 in other suitable ways.

Figure 4:
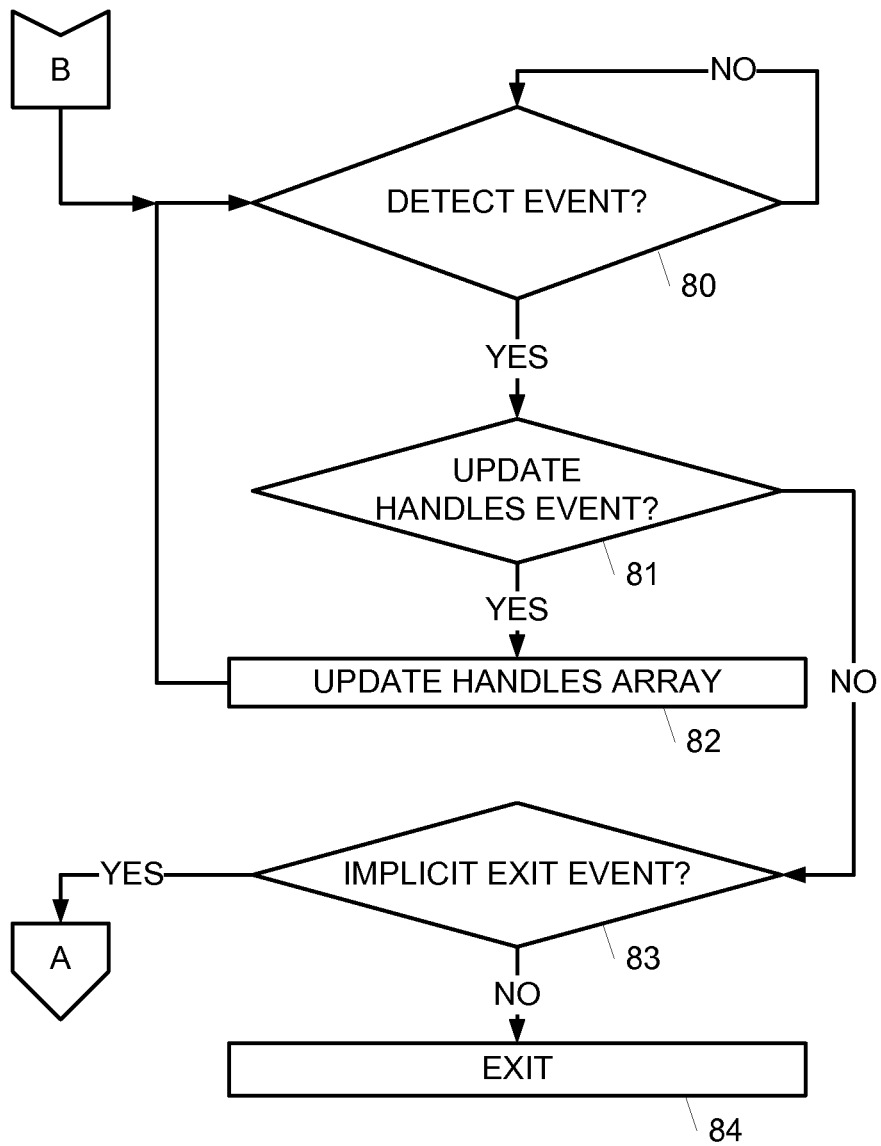
FIG. 4 is a flow chart illustrating an embodiment of a method for responding to events.

FIG. 4 is a flow chart illustrating an embodiment of a method for responding to events performed by a daemon of scheduler 22. The daemon may be created in response to an external execution context 20 being inducted into scheduler 22.

The daemon detects events that include an update handles event, an implicit exit event, and a terminate daemon event. Scheduler 22 sets the update handles event in response to an external execution context 20 being inducted into scheduler 22. Operating system 14 sets the implicit exit event designated for an autonomous context that the scheduler 22 previously registered with operating system 14 in response to an autonomous execution context 20 implicitly exiting scheduler 22. Scheduler 22 sets the terminate daemon event in response to external count 24 of scheduler 22 indicating that all execution contexts 20 inducted into scheduler 22 have exited.

The daemon monitors for an event as indicated in a block 80. When an update handles event is detected as indicated in a block 81, the daemon updates the handles array of scheduler 22 with the handle of the external execution context 20 being inducted into scheduler 22 as indicated in a block 82. When an implicit exit event is detected as indicated in a block 83, the daemon calls the functions shown in FIG. 3B as indicated by block A in FIG. 4 to detach the autonomous execution context 20 from scheduler 22. The daemon resumes monitoring for events subsequent the functions of shown in FIG. 3B being performed as indicated by block B. If neither an update handles event nor an implicit exit event is detected, the daemon process the event of block 80 as a terminate daemon event and exits as indicated in a block 84.

In other embodiments, the daemon may explicitly monitor the state of both external execution contexts 20 and internal execution contexts 34 and 38.

Figure 5A:
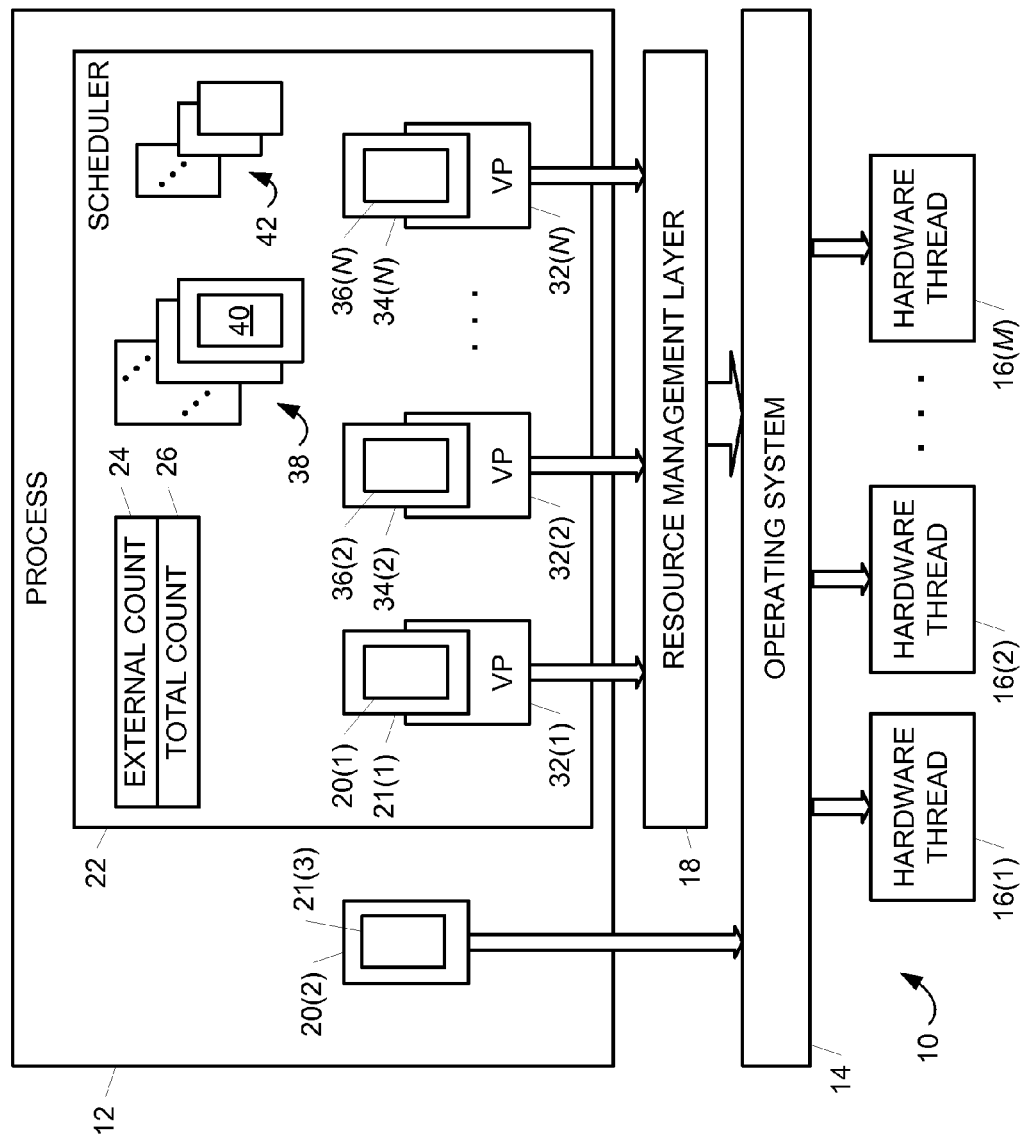
FIGS. 5A-5B are block diagrams illustrating embodiments of a runtime environment that allows a scheduler with multiple inducted execution contexts in a process to be finalized.
Figure 5B:
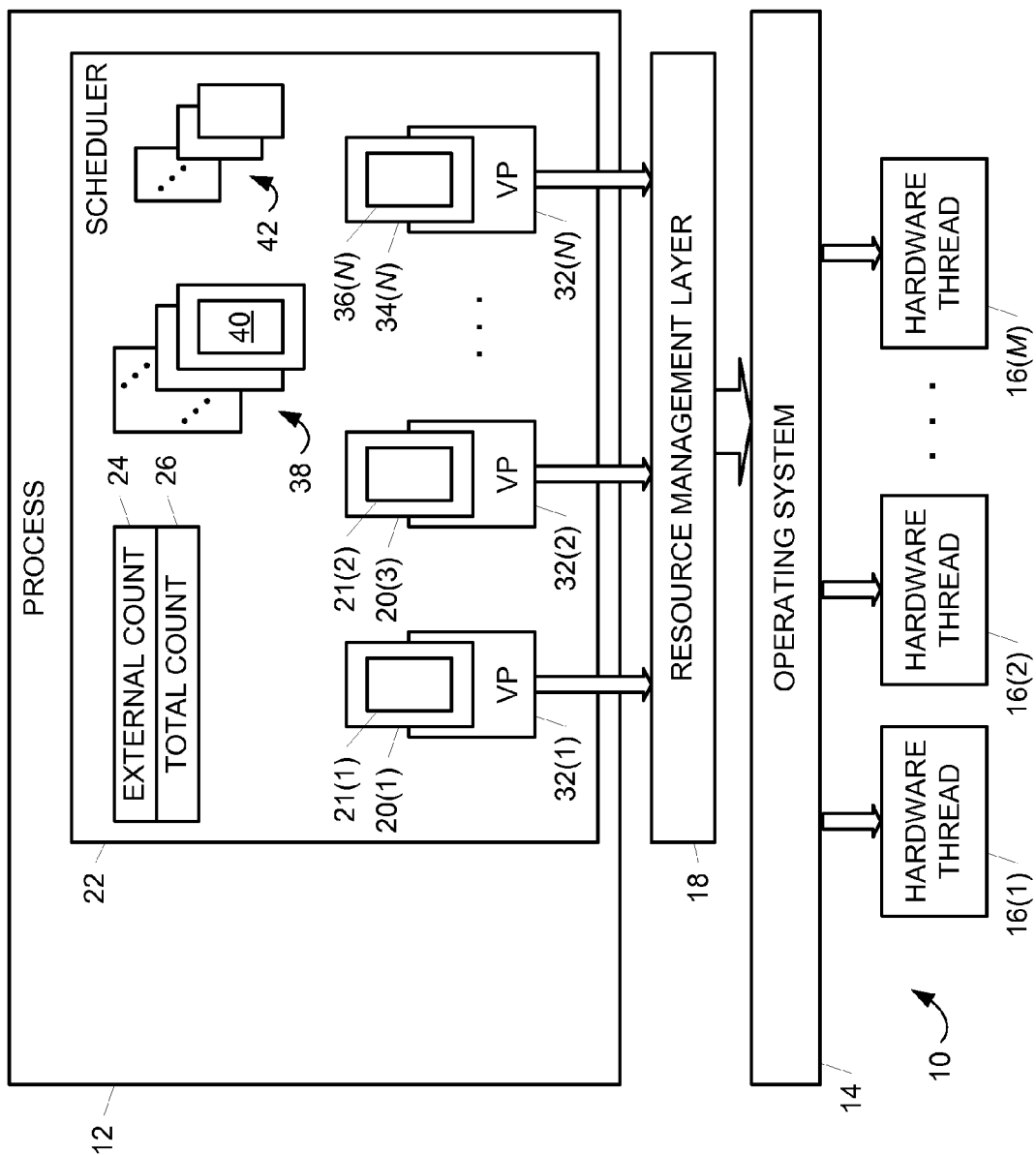

Using the above embodiments, multiple external execution contexts 20 may be inducted into the same scheduler 22 prior to scheduler 22 being finalized as shown in the examples of FIGS. 5A-5B. FIGS. 5A-5B are block diagrams illustrating embodiments of runtime environment 10 that allows scheduler 22 with multiple inducted execution contexts 20 in process 12 to be finalized.

Referring to FIG. 5A, external execution context 20(1) has been inducted into scheduler 22 and is executing a task 21(1) on virtual processor 32(1). Another external execution context 20(2) with a task 20(3) is outside of scheduler 22 in process 12. In FIG. 5B, external execution context 20(2) has been inducted into scheduler 22 and is executing a task 21(3) on virtual processor 32(2). The functions of blocks 61-68 in the method of FIGS. 3A-3B are performed by scheduler 22 for external execution context 20(2). Accordingly, the handles array is updated and external count 24 and total count 26 are incremented when external execution context 20(2) is inducted into scheduler 22. Scheduler 22 continues to cause tasks 21, 40, and 42 until all external execution contexts 20 have exited and internal execution contexts 34 and 38 have been retired (i.e., external count 24 and total count 26 become zero) before finalizing as described above.

Figure 6A:
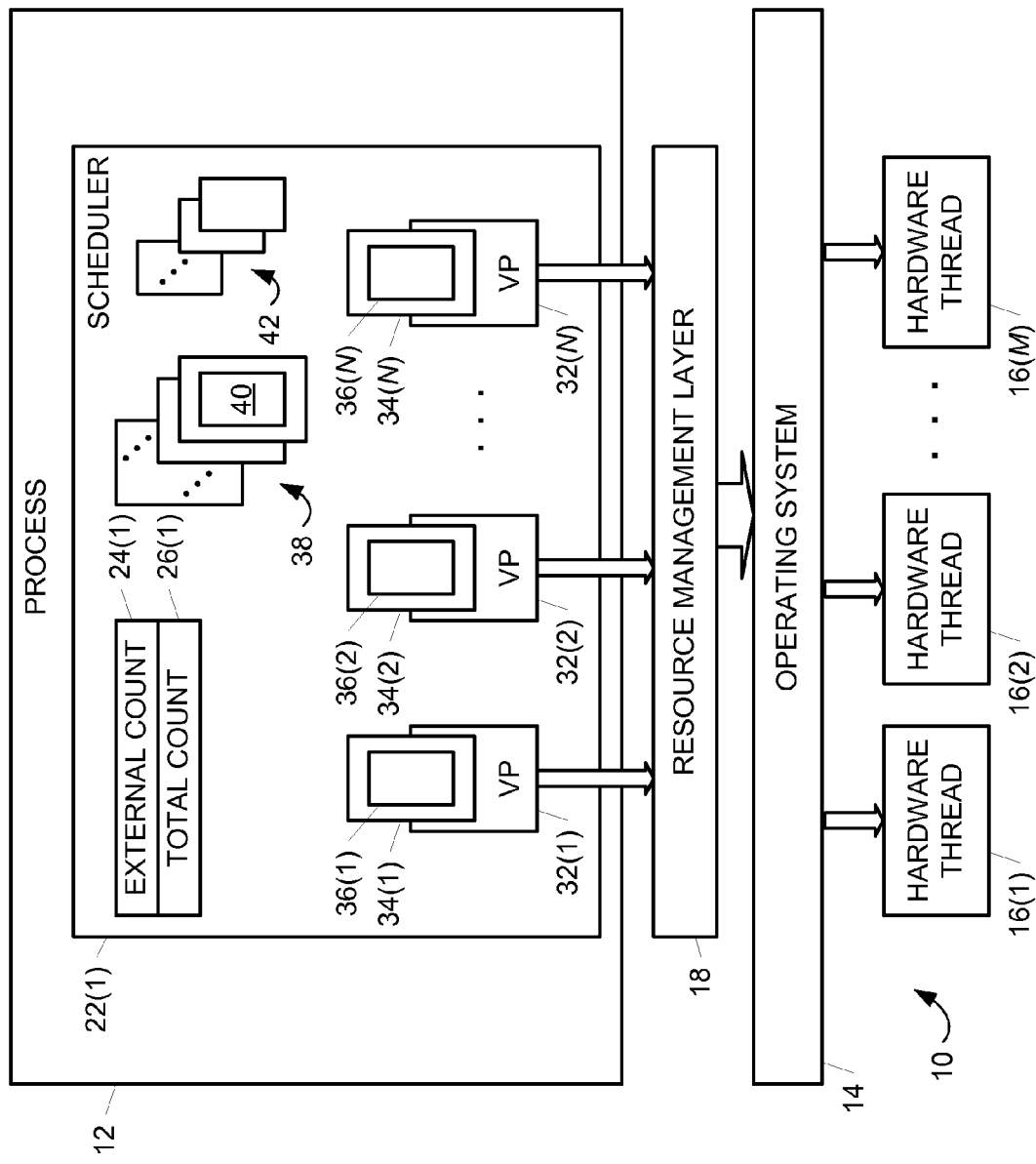
FIGS. 6A-6B are block diagrams illustrating embodiments of a runtime environment that allows a nested scheduler in a process to be finalized.
Figure 6B:
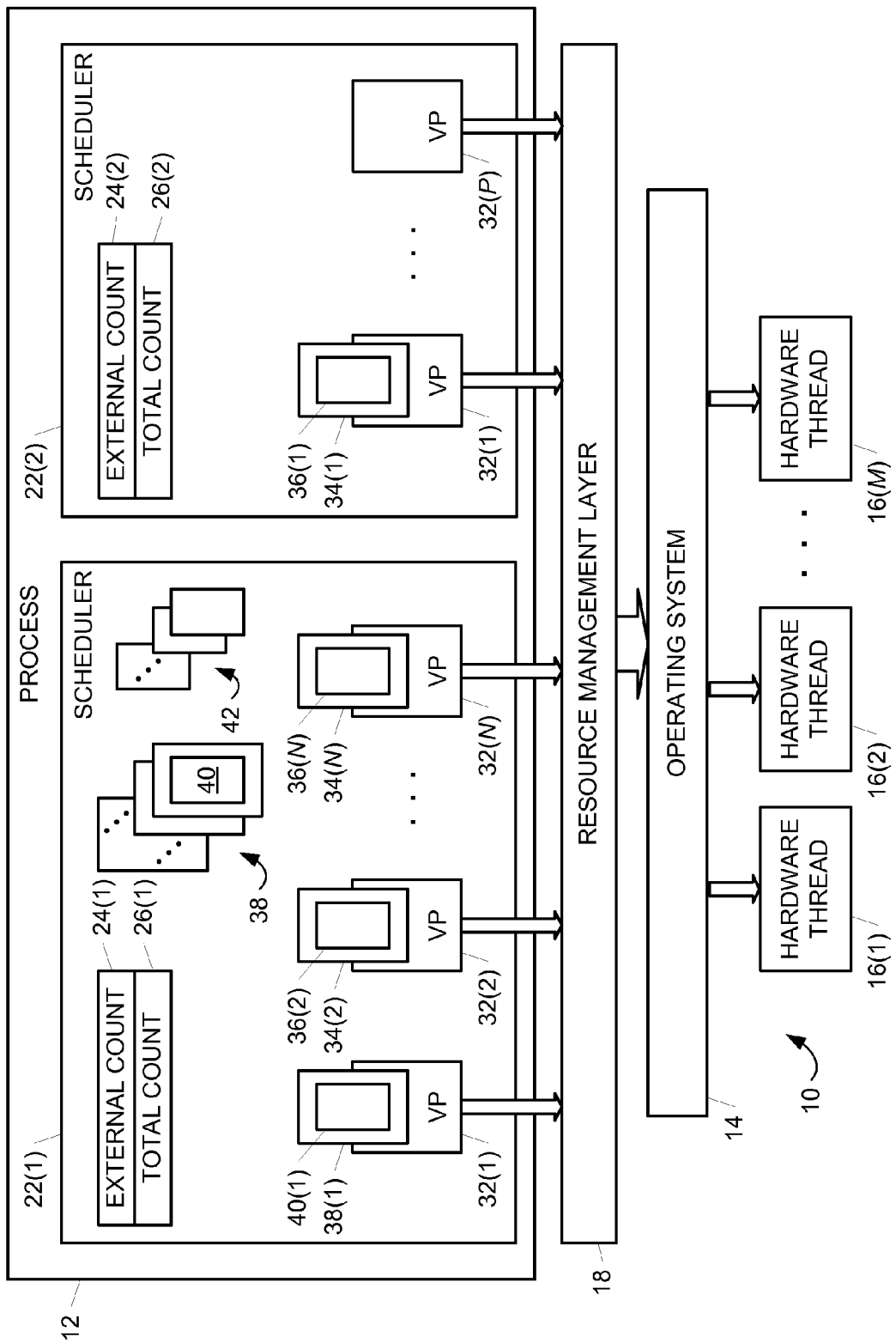

In addition, nested schedulers 22 may be created in process 12. Each nested scheduler 22 may be individually finalized when all external execution contexts 20 of a nested scheduler 22 have exited and internal execution contexts 34 and 38 of a nested scheduler 22 have been retired as shown in the examples of FIGS. 6A-6B. FIGS. 6A-6B are block diagrams illustrating embodiments of runtime environment 10 that allows nested scheduler 22 in process 12 to be finalized.

In FIG. 6A, a scheduler 22(1) includes virtual processors 32(1)-32(N) executing respective tasks 36(1)-36(N) on respective execution contexts 34(1)-34(N). Scheduler 22(1) includes an external count 24(1) and a total count 26(1) and is configured to finalize when external count 24(1) and total count 26(1) become zero as described above.

While executing on virtual processor 32(1) in scheduler 22(1), task 36(1) creates a scheduler 22(2) with virtual processors 32(1)-32(P) and an external count 24(2) and a total count 26(2) as shown in FIG. 6B (i.e., task 36(1) causes the function of block 60 in the method of FIGS. 3A-3B to be performed). In response to creating scheduler 22, execution context 34(1) moves to a virtual processor 32(1) of scheduler 22(2) to continue executing task 36(1). The functions of blocks 61-68 in the method of FIGS. 3A-3B are performed by scheduler 22(2) for execution context 34(1). Although execution context 34(1) is an internal execution context from the perspective of scheduler 22(1), execution context 34(1) represents an external execution context from the perspective of scheduler 22(2). Additional external execution contexts may be inducted into scheduler 22(2) from process 12 or other schedulers 22 (not shown) and additional internal execution contexts may be created within scheduler 22(2) (not shown). Scheduler 22(2) finalizes when external count 24(2) and total count 26(2) become zero to indicate that all external execution contexts inducted into scheduler 22(2) have exited and internal execution contexts created by scheduler 22(2) have been retired.

In response to exiting explicitly from scheduler 22(2), execution context 34(1) may return to scheduler 22(1) and be picked up for execution by an available virtual processor 32 in scheduler 22(1) prior to or subsequent to scheduler 22(2) being finalized.

In one embodiment, process 12 organizes tasks into one or more schedule groups 90 and presents schedule groups 90 to scheduler 22. FIG. 7 is a block diagram illustrating an embodiment of a schedule group 90 for use in scheduler 22.

Schedule group 90 includes a runnables collection 92, a realized task collection 53, a work collection 94, and a set of zero or more workstealing queues 96. Runnables collection 92 contains a list of unblocked execution contexts 38. Scheduler 22 adds an execution context 38 to runnables collections 92 when an execution context becomes unblocked. Realized task collection 93 contains a list of realized tasks 40 (e.g., unstarted agents) that may or may not have associated execution contexts 38. Scheduler 22 adds a realized task to realized task collection 93 when a new runnable task is presented to scheduler 22 by process 12. Work collection 94 contains a list of workstealing queues 96 as indicated by an arrow 98 and tracks the execution contexts 34 that are executing tasks from the workstealing queues 96. Each workstealing queue 96 includes one or more unrealized tasks 42.

Using the embodiment of FIG. 7, scheduler 22 may first search for unblocked execution contexts 38 in the runnables collection 92 of each schedule group 90 in scheduler 22. Scheduler 22 may then search for realized tasks in the realized task collection 93 of all schedule groups 90 in scheduler 22 before searching for unrealized tasks in the workstealing queues 96 of the schedule groups 90.

In one embodiment, a virtual processor 32 that becomes available may attempt to locate a runnable execution context 38 in the runnables collection 92 or a realized task 40 in the realized task collection 93 in the schedule group 90 from which the available virtual processor 32 most recently obtained a runnable execution context 38 (i.e., the current schedule group 90). The available virtual processor 32 may then attempt to locate a runnable execution context 38 in the runnables collections 92 or a realized task 40 in the realized task collection 93 in the remaining schedule groups 90 of scheduler 22 in a round-robin or other suitable order. If no runnable execution context 38 is found, then the available virtual processor 32 may then attempt to locate an unrealized task 42 in the worksteeling queues 96 of the current schedule group 90 before searching the worksteeling queues 96 in the remaining schedule groups 90 of scheduler 22 in a round-robin or other suitable order.

Figure 8:
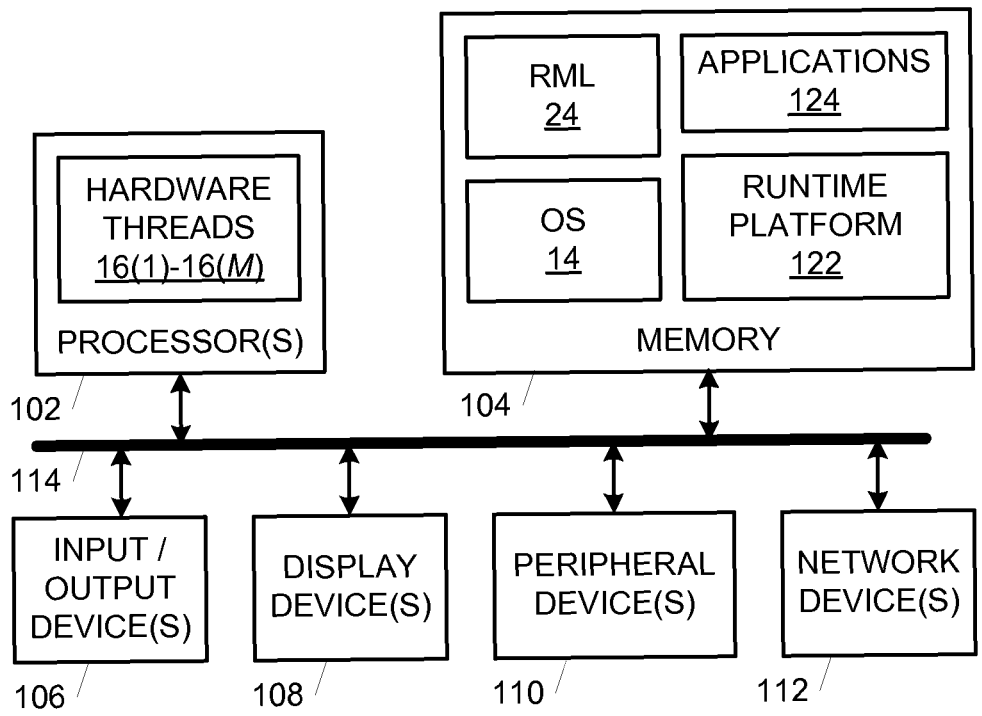
FIG. 8 is a block diagram illustrating an embodiment of a computer system configured to implement a runtime environment that allows a scheduler in a process to be finalized.

FIG. 8 is a block diagram illustrating an embodiment of a computer system 100 configured to implement runtime environment 10 that allows scheduler 22 in process 12 to be finalized.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each hardware thread 16 in processor packages 102 is configured to access and execute instructions stored in memory system 104. The instructions may include a basic input output system (BIOS) or firmware (not shown), OS 14 (also shown in FIGS. 1A-1D), a runtime platform 122, applications 124, and resource management layer 18 (also shown in FIGS. 1A-1D). Each hardware thread 16 may execute the instructions in conjunction with or in response to information received from input/output devices 106, display devices 108, peripheral devices 110, and/or network devices 112.

Computer system 100 boots and executes OS 14. OS 14 includes instructions executable by hardware threads 16 to manage the components of computer system 100 and provide a set of functions that allow applications 124 to access and use the components. In one embodiment, OS 14 is the Windows operating system. In other embodiments, OS 14 is another operating system suitable for use with computer system 100.

Resource management layer 18 includes instructions that are executable in conjunction with OS 14 to allocate resources of computer system 100 including hardware threads 16 as described above with reference to FIGS. 1A-1D. Resource management layer 18 may be included in computer system 100 as a library of functions available to one or more applications 124 or as an integrated part of OS 14.

Runtime platform 122 includes instructions that are executable in conjunction with OS 14 and resource management layer 18 to generate runtime environment 10 and provide runtime functions to applications 124. These runtime functions include a scheduler function and a scheduler finalization function as described in additional detail above with reference to FIGS. 1A-1D. The runtime functions may be included in computer system 100 as part of an application 124, as a library of functions available to one or more applications 124, or as an integrated part of OS 14 and/or resource management layer 18.

Each application 124 includes instructions that are executable in conjunction with OS 14, resource management layer 18, and/or runtime platform 122 to cause desired operations to be performed by computer system 100. Each application 124 represents one or more processes, such as process 12 as described above, that may execute with scheduler 22 as provided by runtime platform 122.

Memory system 104 includes any suitable type, number, and configuration of volatile or non-volatile storage devices configured to store instructions and data. The storage devices of memory system 104 represent computer readable storage media that store computer-executable instructions including OS 14, resource management layer 18, runtime platform 122, and applications 124. The instructions are executable by computer system to perform the functions and methods of OS 14, resource management layer 18, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

The above embodiments allow a runtime environment to finalize a scheduler in a process without terminating the process. By doing so, the runtime environment may prevent schedulers with no execution contexts from undesirably affecting the performance of the process.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method comprising:
tracking a first set of execution contexts inducted into a scheduler in a process executing on a computer system;
tracking a second set of execution contexts created within the scheduler; and
finalizing the scheduler prior to the process completing in response to all of the execution contexts in the first set of execution contexts exiting the scheduler and all of the execution contexts in the second set of execution contexts being retired by the scheduler, the finalizing including allowing the first set of execution contexts to continue to execute tasks in other schedulers subsequent to exiting the scheduler.

2. The method of claim 1 further comprising:
continuing to execute one of the execution contexts in the first set of execution contexts subsequent to the one of the execution contexts in the first set of execution contexts exiting the scheduler.

3. The method of claim 1 further comprising:
executing one of the execution contexts in the first set of execution contexts to completion within the scheduler.

4. The method of claim 1 further comprising:
tracking the first set of execution contexts by maintaining a first count;
tracking the second set of execution contexts by maintaining a second count; and
finalizing the scheduler in response to the first count indicating that all of the first set of execution contexts have exited the scheduler and the second count indicating that all of the second set of execution contexts have been retired by the scheduler.

5. The method of claim 4 further comprising:
adjusting the first count each time one of the execution contexts in the first set of execution contexts is inducted in the scheduler and each time one of the execution contexts in the first set of execution contexts exits the scheduler; and
adjusting the second count each time one of the execution contexts in the second set of execution contexts is created in the scheduler and each time one of the execution contexts in the second set of execution contexts is retired in the scheduler.

6. The method of claim 1 further comprising:
creating the scheduler with one of the execution contexts in the first set of execution contexts.

7. The method of claim 1 further comprising:
executing the first and the second sets of execution contexts with a set of processing resources allocated to the scheduler.

8. The method of claim 7 wherein the set of processing resources includes a set of virtual processors and a set of hardware threads.

9. A method comprising:
creating, with a first execution context of a process executing on a computer system, a first scheduler having a first set of processing resources;
executing the first execution context and a first set of execution contexts created by the first execution context with the first set of processing resources; and
finalizing the first scheduler prior to the process completing in response to detecting that the first execution context has exited the first scheduler and the first set of execution contexts have been retired in the first scheduler, the finalizing including allowing the first execution context to continue to execute tasks in at least one other scheduler subsequent to exiting the first scheduler.

10. The method of claim 9 further comprising:
inducting a second execution context of the process into the first scheduler;
executing the second execution context and a second set of execution contexts created by the second execution context with the first set of processing resources; and
finalizing the first scheduler in response to detecting that the first and the second execution contexts have exited the first scheduler and the first and the second sets of execution contexts have been retired in the first scheduler.

11. The method of claim 9 further comprising:
creating, with one of the execution contexts in the first set of execution contexts, a second scheduler having a second set of processing resources;
executing the one of the execution contexts in the first set of execution contexts and a second set of execution contexts created by the one of the execution contexts in the first set of execution contexts with the second set of processing resources; and
finalizing the second scheduler in response to detecting that the one of the execution contexts in the first set of execution contexts has exited the second scheduler and the second set of execution contexts have been retired in the second scheduler.

12. The method of claim 11 further comprising:
inducting a second execution context of the process into the second scheduler;
executing the second execution context and a third set of execution contexts created by the second execution context with the second set of processing resources; and
finalizing the second scheduler in response to detecting that the one of the execution contexts in the first set of execution contexts and the second execution context have exited the second scheduler and the second and the third sets of execution contexts have been retired in the first scheduler.

13. The method of claim 9 further comprising:
creating the first scheduler to include an external count and a total count;
detecting that the first execution context has exited using the external count; and
detecting that the first set of execution contexts have exited using the total count.

14. The method of claim 9 further comprising:
creating the first scheduler to include a daemon that detects an implicit exit of the first execution context.

15. A computer readable storage medium, which is not a transitory propagating signal, storing computer-executable instructions that, when executed by a computer system, perform a method comprising:
executing a first execution context with one of a first set of processing resources allocated to a first scheduler in a process executing on the computer system;
creating, with the first execution context, a second scheduler in the process having a second set of processing resources;
executing the first execution context and a first set of execution contexts created by the first execution context in the second scheduler with the second set of processing resources; and finalizing the second scheduler prior to the process completing in response to detecting that the first execution context has exited the second scheduler and the first set of execution contexts has been retired in the second scheduler, the finalizing including allowing the first execution context to continue to execute tasks in at least one other scheduler subsequent to exiting the second scheduler.

16. The computer readable storage medium of claim 15, the method further comprising:

returning the first execution context to the first scheduler in response to the first execution context exiting from the second scheduler.

17. The computer readable storage medium of claim 15, the method further comprising:

detecting that the first execution context has exited the second scheduler and the first set of execution contexts been retired in the second scheduler using first and second counts associated with the second scheduler.

18. The computer readable storage medium of claim 15, the method further comprising:

finalizing the first scheduler in response to detecting that the first execution context has exited the first scheduler and a second set of execution contexts created by the first execution context in the first scheduler been retired in the first scheduler.

19. The computer readable storage medium of claim 15, the method further comprising:

detecting that the first execution context has exited the first scheduler and the second set of execution contexts been retired in the first scheduler in response to being instructed to exit using first and second counts associated with the first scheduler.

* * * * *